United States Patent
Frachon

(10) Patent No.: US 12,044,588 B2
(45) Date of Patent: Jul. 23, 2024

(54) POSITION SENSOR, IN PARTICULAR INTENDED FOR DETECTING THE TORSION OF A STEERING COLUMN

(71) Applicant: Moving Magnet Technologies, Besançon (FR)

(72) Inventor: Didier Frachon, Besançon (FR)

(73) Assignee: Moving Magnet Technologies, Besançon (FR)

(\*) Notice: Subject to any disclaimer, the term of this patent is extended or adjusted under 35 U.S.C. 154(b) by 401 days.

(21) Appl. No.: 17/433,745

(22) PCT Filed: Feb. 25, 2020

(86) PCT No.: PCT/FR2020/050351
§ 371 (c)(1),
(2) Date: Aug. 25, 2021

(87) PCT Pub. No.: WO2020/174170
PCT Pub. Date: Sep. 3, 2020

(65) Prior Publication Data
US 2022/0146346 A1    May 12, 2022

(30) Foreign Application Priority Data
Feb. 25, 2019    (FR) ...................................... 1901904

(51) Int. Cl.
*G01L 3/10*    (2006.01)
*G01L 5/22*    (2006.01)
(Continued)

(52) U.S. Cl.
CPC .............. *G01L 3/104* (2013.01); *G01L 5/221* (2013.01); *H02K 1/16* (2013.01); *H02K 1/27* (2013.01)

(58) Field of Classification Search
CPC . G01L 3/101; G01L 3/104; G01L 5/22; G01L 5/221
See application file for complete search history.

(56) References Cited

U.S. PATENT DOCUMENTS

| 2010/0005909 A1 | 1/2010 | Antoni et al. |
| 2010/0084215 A1* | 4/2010 | Sakatani ................. B62D 6/10 180/444 |

(Continued)

FOREIGN PATENT DOCUMENTS

| EP | 1774272 B1 | 9/2012 |
| EP | 3181431 B1 | 8/2020 |

(Continued)

OTHER PUBLICATIONS

International Search Report For International Application No. PCT/FR2020/050351 dated Jun. 8, 2020, 2 pages.

(Continued)

*Primary Examiner* — Erika J. Villaluna
(74) *Attorney, Agent, or Firm* — TraskBritt

(57) ABSTRACT

A position sensor, in particular, intended for detecting the torsion of a steering column, includes a first magnetized rotor structure comprising magnets, a second stator structure comprising two rings extended by teeth that are axially oriented and interlocked, and a third stationary collector structure including two flux collection parts that define at least one air gap in which at least one magnet-sensitive element is placed. The flux collection parts and the ring gears define a magnetic permeance independent of the relative radial and angular position of the second stator structure with respect to the third collector structure. The collection parts comprise an angular collection sector and a primary collection zone continued by a prolongation having a secondary collection zone. The secondary collection zones (Continued)

end in flat extensions forming two poles of the air gap. The transverse median plane of the air gap intersects at least one of the prolongations.

15 Claims, 14 Drawing Sheets

(51) Int. Cl.
*H02K 1/16* (2006.01)
*H02K 1/27* (2022.01)

(56) References Cited

U.S. PATENT DOCUMENTS

| | | |
|---|---|---|
| 2013/0152702 A1 | 6/2013 | Takahashi et al. |
| 2016/0214648 A1 | 7/2016 | Schoepe et al. |

FOREIGN PATENT DOCUMENTS

| | | |
|---|---|---|
| JP | 2009-020064 A | 1/2009 |
| JP | 2013-127368 A | 6/2013 |
| WO | 2008/044689 A1 | 4/2008 |
| WO | 2012/084288 A1 | 6/2012 |

OTHER PUBLICATIONS

International Written Opinion For International Application No. PCT/FR2020/050351 dated Jun. 8, 2020, 8 pages.

JP Notice of Reasons for Refusal for Japanese Patent Application No. 2021-549647, dated Oct. 26, 2023, 13 pages with English translation.

JP Search Report for Japanese Patent Application No. 2021-549647, dated Oct. 26, 2023, 32 pages with english translation.

* cited by examiner

POSITION SENSOR, IN PARTICULAR INTENDED FOR DETECTING THE TORSION OF A STEERING COLUMN

CROSS-REFERENCE TO RELATED APPLICATIONS

This application is a national phase entry under 35 U.S.C. § 371 of International Patent Application PCT/FR2020/050351, filed Feb. 25, 2020, designating the United States of America and published as International Patent Publication WO 2020/174170 A1 on Sep. 3, 2020, which claims the benefit under Article 8 of the Patent Cooperation Treaty to French Patent Application Serial No. 1901904, filed Feb. 25, 2019.

TECHNICAL FIELD

The present disclosure relates to the field of position sensors, and more particularly to position sensors intended for measuring the torsion of a steering column, without this application being exclusive.

BACKGROUND

The general principle of such a sensor is described in European patent EP1774272.

This position sensor, which is, in particular, intended for detecting the torsion of a steering column, consists of a first magnetic rotor structure comprising a plurality of magnets, a second stator structure comprising two rings extended by teeth that are axially oriented and interlocked, and a third stationary collector structure consisting of two flux collection parts that define at least one air gap in which at least one magnet-sensitive element is placed.

The flux collection parts and the stator rings define therebetween a magnetic permeance independent of the relative radial and angular position of the second stator structure and of the third collector structure.

Compared with previous sensors, such a sensor makes it possible to reduce the magnetic signal losses between the stator part and the part comprising the Hall probe, to improve the signal-to-noise ratio suitable for performing a reliable measurement, to increase the modulation of the magnetic flux of the sensor on its mechanical stroke and to provide robustness to the relative positioning tolerances of the stator part and of the part comprising the Hall probe.

However, these improvements do not regulate the sensitivity to external magnetic and electromagnetic fields that disturb the useful field detected by the Hall probe.

In particular, when the sensor is placed in an environment comprising magnetic masses or sources of electromagnetic radiation, it undergoes disturbances distorting the signal supplied by the sensor.

BRIEF SUMMARY

In order to address these drawbacks, the object of the present disclosure is not to create a magnetic shielding to the external interference field as a person skilled in the art would do, but to create, on each flux collector structure, two zones for collecting this interference field, respectively, called primary collection zone and secondary collection zone, arranged in a particular manner with respect to the measurement air gap.

The principle of the present disclosure, in fact, involves bringing the collected field into the measurement air gap, but in two different directions of flow ultimately allowing the overall component of the interference field to be canceled. From this perspective, it is sought, preferentially but not restrictively, to collect as much interference field with the primary collection zone as with the secondary collection zone and to reverse the two fields at the air gap with respect to one another, owing to the relative positioning of these two zones, while maximizing the useful flux in this air gap.

More particularly, by positioning a primary collection zone on one side of the median transverse plane defining the air gap and a secondary collection zone on the other side of the median transverse plane defining the air gap, a magnetic field reversal zone is created by combining two flux collector structures that reverse the direction of the collected magnetic field crossing the air gap. The flux collected by the primary and secondary collection zones of the first collector structure is canceled out or minimized in cooperation with the flux collected by the primary and secondary collection zones of the second structure, as will be better appreciated in the various figures.

The present disclosure relates in its most general sense to a position sensor, in particular, intended for detecting the torsion of a steering column, including a first magnetized magnetic rotor structure comprising a plurality of magnets, a second stator structure comprising two rings extended by teeth that are axially oriented and interlocked, and a third stationary collector structure including two flux collection parts that define at least one air gap in which at least one magnet-sensitive element is placed, the flux collection parts and the toothed rings defining therebetween a magnetic permeance independent of the relative radial and angular position of the second stator structure with respect to the third collector structure, the collection parts each comprising an angular collection sector wherein each collection part has at least one primary collection zone continued by at least one prolongation having at least one secondary collection zone, in that the secondary collection zones are terminated by flat extensions forming the two poles of the air gap and in that the transverse median plane of the air gap intersects at least one of the prolongations.

The present disclosure also relates to a sensor having the following features, taken in isolation or in any technically conceivable combination:
- The median plane is parallel to the planes of the primary collection zones.
- The primary collection zones are parallel to the secondary collection zones.
- The prolongation extends axially and perpendicular to the plane of the primary collection zone beyond the transverse median plane.
- The prolongation is continued by a flat section forming a secondary collection zone parallel to the plane of the primary collection zone.
- The secondary collection zone has a parallelepipedal shape.
- Two sides of the secondary collection zone are extended by a tab oriented in the direction of the angular collection sector and exhibiting a flat extension, forming a pole of the air gap.
- One of the primary collection zones is extended by at least one secondary collection zone extending on either side of the prolongation.
- At least one of the secondary collection zones defines a reversal region with tangent surfaces parallel to the primary collection zones.
- The transverse median plane extends between the primary collection zone and the tangent surfaces.

The tangent surfaces extend in the direction of the air gap and of the primary collection zone ending in an extension to form the second pole of the air gaps.

The third collector structure comprises two secondary collection zones, the first secondary collection zone being placed in a plane parallel to the plane of the primary collection zone to which it is magnetically coupled via the secondary collection zone, one front end of which defines one of the poles of the air gap, the transverse median plane of the air gap being situated between this first secondary collection zone and the primary collection zone, the second secondary collection zone being placed in a plane parallel to the plane of the primary collection zone to which it is magnetically coupled by means of plane extensions, one front end of which defines the other of the poles of the air gap, the transverse median plane of the air gap being situated between this first secondary collection zone and the primary collection zone.

The total area of the secondary collection zone is equal to the total area of the primary collection zone.

The present disclosure also relates to a device for detecting the absolute position of a steering column, wherein it further comprises a sensor for the torsion of the column including a first magnetized magnetic rotor structure comprising a plurality of magnets, a second stator structure comprising two rings extended by teeth that are axially oriented and interlocked, and a third stationary collector structure including two flux collection parts that define at least one air gap in which at least one magnet-sensitive element is placed, the flux collection parts and the toothed rings defining therebetween a magnetic permeance independent of the relative radial and angular position of the second stator structure with respect to the third collector structure, the collection parts each comprising an angular collection sector, each collection part having at least one primary collection zone continued by at least one prolongation having at least one secondary collection zone, the secondary collection zones being terminated by flat extensions forming the two poles of the air gap and the transverse median plane of the air gap intersecting at least one of the prolongations.

BRIEF DESCRIPTION OF THE DRAWINGS

The different specificities of the optimized angle sensor will appear more clearly through the description of the following figures.

Throughout the figures, it is considered that the collection zones have active collection surfaces that are generally perpendicular to the axis of the sensor, although their orientation may be different. The side surfaces play a lesser role compared to these collection surfaces. Likewise, for a better understanding of the elements and their functions, it must be considered for simplification that the interference field is generally oriented axially, or orthoradially in the case of FIG. 9, although the orientation of this field does not affect the performance of the sensor, the collection zones being ferromagnetic and bending the field lines perpendicular to their surface at the iron-air interface.

DETAILED DESCRIPTION

Figure 1A:
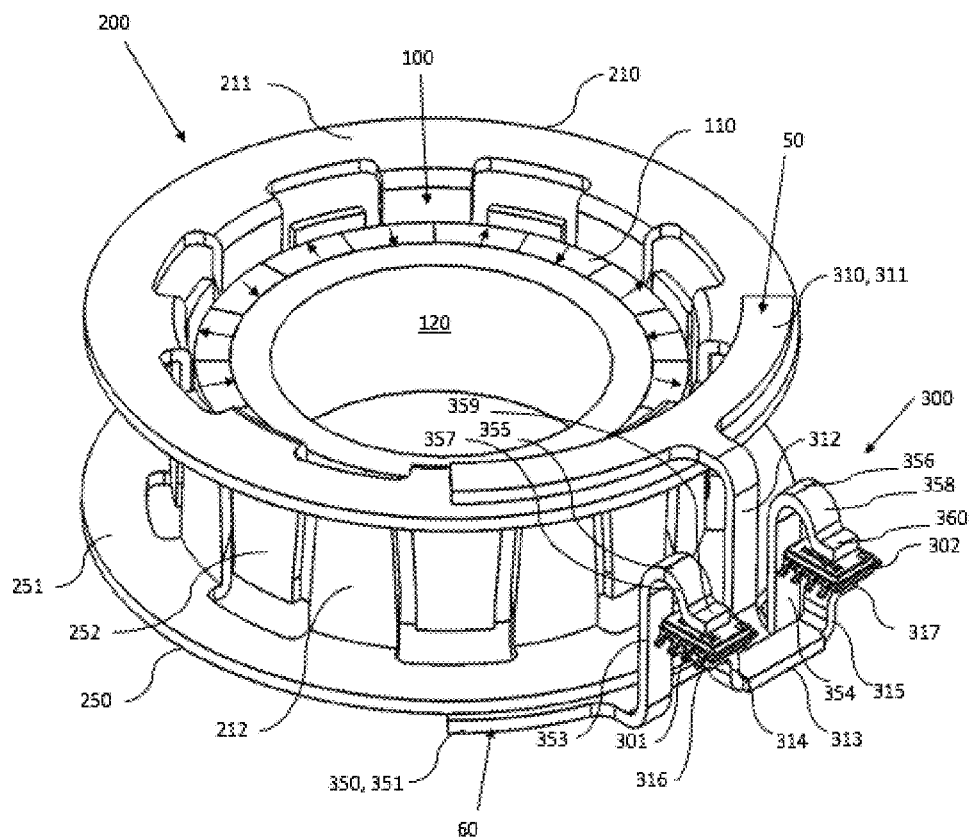
FIGS. 1A and 1B show two perspective views of a first embodiment of an angle sensor according to the present disclosure.
Figure 1B:
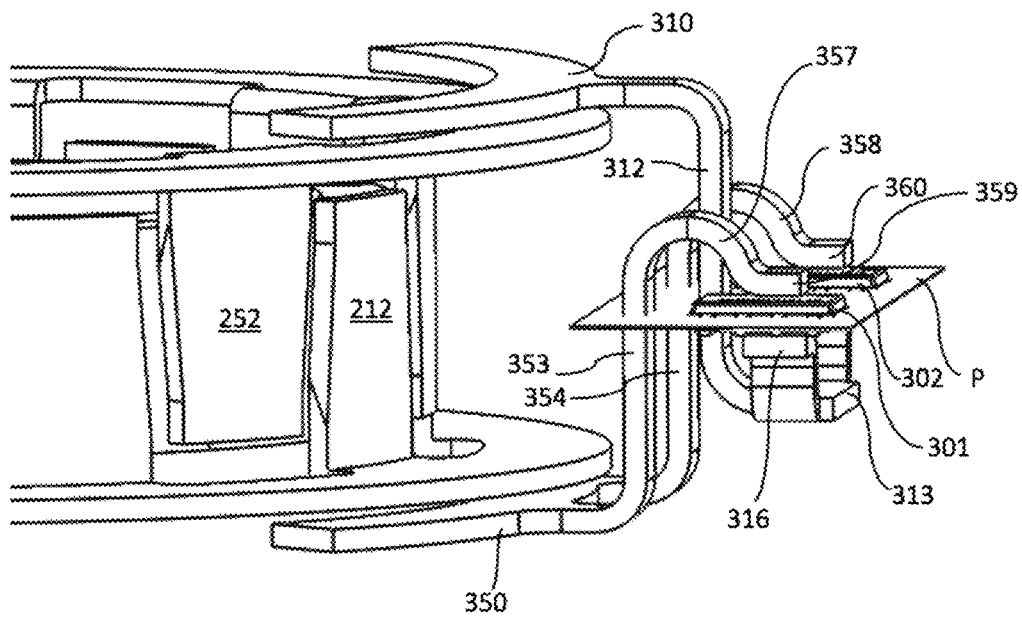

FIGS. 1A and 1B show perspective views of a first embodiment of an angle sensor intended to perform a measurement over a stroke of approximately eight degrees of a torsion shaft fitted to a steering column. The dimensions that are given below are indicative and can be modified according to the different specifications.

The sensor includes three structures:
- a magnetized rotor structure (100), driven by the shaft of the steering column,
- a stator structure (200) formed by two toothed rings (210, 250), and
- a flux collector structure (300) comprising two magnet-sensitive probes (301, 302) and formed by two collection parts (50, 60).

The magnetized rotor structure (100) comprises an alternation of magnets forming a tubular magnet with N pairs of poles (110) 7 millimeters high, preferably, but not limitingly, magnetized radially in order to form a ring with an internal diameter of 34.8 millimeters and an external diameter of 37.8 millimeters, mounted on a cylindrical yoke (120) of the same height as the magnet and with an internal diameter of 31 millimeters.

The stator structure (200) comprises two toothed rings (210, 250) mounted facing each other and angularly offset by an angle corresponding to the pole pitch of the magnet.

Each of these toothed rings (210, 250) comprises a circular ring (211, 251) with an internal diameter of 39.2 millimeters and an external diameter of 49 millimeters extended by M teeth (212, 252) assuming the form of cylinder portions 7 millimeters high, oriented axially so as to collaborate with the outer faces of the magnets constituting the first magnetized rotor structure (100).

The teeth (212, 252) show an angular width seen from the axis of the sensor, which increases, over one part, from 23 degrees at the tip to 26 degrees at the root, so as to increase the passage section of the flux through the tooth root knowing that the thickness of the sheet metal used is 0.8 millimeters.

The two stators (210, 250) are interlocked over a distance of 4.25 millimeters so that the inter-stator distance between the two circular rings (211, 251) reaches 9.75 millimeters.

These circular rings (211, 251) are able to transmit the flux coming from the magnetized rotor structure (100) to the collection parts (50, 60) comprising angular collection sectors (310, 350) that constitute the collector structure (300) and that they face through an air gap of 0.7 millimeters.

In addition, the angular collection sectors (310, 350) are sized so as to cover part of the toothed rings (210, 250), over an arc of approximately 100° in the described example.

This sizing leads to insensitivity to the radial offset of the stator structure (200) relative to the collector structure (300) as long as the latter remains less than 0.5 millimeters from the radius.

One or two branches—or prolongations—(312, 353, 354) with a width of 4.5 millimeters extend the angular collection sectors (310, 350) and make it possible to close the flux in two air gaps with a height of 1.75 millimeters located radially to the exterior of the stators (210, 250) and in which two magnet-sensitive probes (301, 302) are placed and maintained by a printed circuit, not shown.

The angular sectors (310, 350) form the main collection zones of the sensor, that is to say, the zones for collecting the flux that is useful to the sensor, which flux is produced by the plurality of magnets of the magnetized rotor structures (100).

In this scenario, the angular sectors (310, 350) also form the primary collection zones (311, 351) collecting the interference flux if it is considered that this interference flow has an axial component.

In this particular case, the collection is carried out on the outside of the toothed rings (210, 250) in order to increase the sensitivity of the probes (301, 302), which requires a higher sensor than in the case of an internal collection, but saves about twenty percent on the sensitivity of the sensor.

The prolongations (312, 353, 354) constitute flux concentrators bringing the magnetic flux collected by the angular collection sectors, respectively (310, 350), toward the air gaps in which the magnet-sensitive probes (301, 302) are placed. The useful flux and the interference flux are thus brought to the measurement air gap.

For the first angular collection sector (310), the prolongation (312) has the form of a blade extending axially, perpendicular to the plane of the angular sector (310), this plane being considered the median plane of the sector. This prolongation (312) extends beyond the fictitious transverse median plane (P) passing through the air gaps and the magnet-sensitive sensors (301, 302), this plane (P) here being parallel to the plane of the angular sector (310).

This prolongation (312) is then continued by a flat section forming a secondary collection zone (313) parallel to the plane of the angular sector (310). This secondary collection zone (313) has a rectangular shape, this shape not being limiting, with sides having an axis corresponding to a radial direction of the sensor and the other axis being parallel to a tangential direction of the stator structure (200).

On either side, this secondary collection zone (313) is in turn extended by two tabs, respectively (314, 315), that are oriented in the direction of the angular sector (310) and that each have a flat extension (316, 317) in a transverse plane forming the first pole of the measurement air gaps. These extensions (316, 317) also constitute, like in all the embodiments, an additional collection zone also collecting part of the interference flux.

The fictitious transverse median plane (P) of the air gaps is positioned between the secondary collection zone (313) and the primary collection zone (311) and intersects the prolongation (312).

For the second angular collection sector (350), two prolongations (353, 354) extend on either side of the prolongation (312) of the opposite angular sector (310).

Each of these two prolongations (353, 354) has the form of a blade extending axially, up to a reversal zone whose tangent surfaces (355, 356) define secondary collection zones (357, 358). In the spirit of the present disclosure, the reversal can be achieved by the curved shape of the collection zones, but it is more generally achieved by the relative positioning of the primary and secondary collection zones with respect to the median plane (P) of the air gap as described above and which forces the flux to follow the air gap in an opposite direction.

The fictitious transverse median plane (P) passing through the air gaps containing the two magnet-sensitive probes (301, 302) extends between the primary collection zone (351) and the secondary collection zones (357, 358) and intersects the prolongations, respectively (353, 354).

The prolongations (353, 354) continue, after reversal, toward the air gap and the angular collection sector (350) and terminate in an extension, respectively (359, 360), in a transverse plane to form the second pole of the air gaps. These extensions (359, 360) also constitute a secondary collection zone also collecting part of the interference flux.

Thus, the magnetic interference flux collected by the primary collection zone (311) and possibly the prolongation (312), but also by the secondary collection zone (313) with the extensions (316, 317) of the first collection part (50), is reversed in the air gap, by the reversal shape given to the additional collection surfaces, with respect to the initial orientation of the interference field. The magnetic interference flux collected by the secondary collection zones (357, 358) with the extensions (359, 360) of the second collection part (60) is oriented in the air gap in the same direction as the initial orientation of the interference field. Thus, the two opposite circulation directions of the interference field in the air gap help to minimize or even cancel this field in the measurement air gap.

Likewise, symmetrically, the magnetic interference flux collected by the primary collection zone (351) and possibly the prolongations (353, 354) of the second collection part (60) is reversed in the air gap, by the reversal shape given to the secondary collection surfaces, with respect to the initial orientation of the interference field at the main collection surfaces. The magnetic interference flux collected by the secondary collection zone (313) of the first collection part (50) is oriented in the air gap in the same direction as the initial orientation of the interference field. Thus, the two opposite circulation directions of the interference field in the air gap help to minimize or even cancel this field in the measurement air gap.

The sum of the collection surfaces of the primary collection zone (311) and possibly of the prolongation (312) is not equal to the collection surface of the secondary collection zones (357, 358), just like the sum of the collection surfaces of the primary collection zone (351) and possibly of the prolongations (353, 354) is not equal to the collection surface of the additional collection zone (313), which has the consequence of not completely canceling the external interference field at the air gaps. This solution nevertheless remains effective in order to minimize the measured interference field component. With the aim of equalizing these surfaces, it is possible, for example, to easily adjust the width of the secondary collection zones. The variant embodiments described below improve performance by illustrating means seeking to equalize the primary and secondary collection surfaces.

Figure 2A:
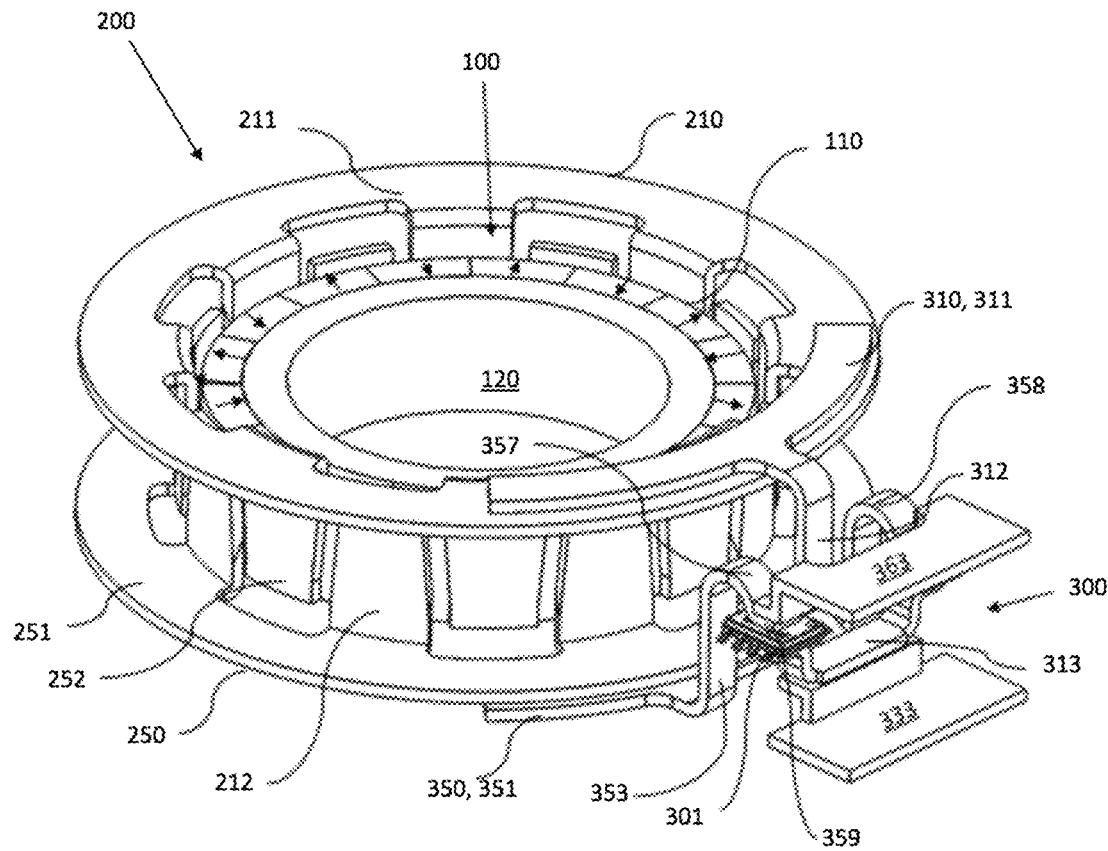
FIGS. 2A and 2B show two perspective views of a second embodiment of an angle sensor according to the present disclosure.
Figure 2B:
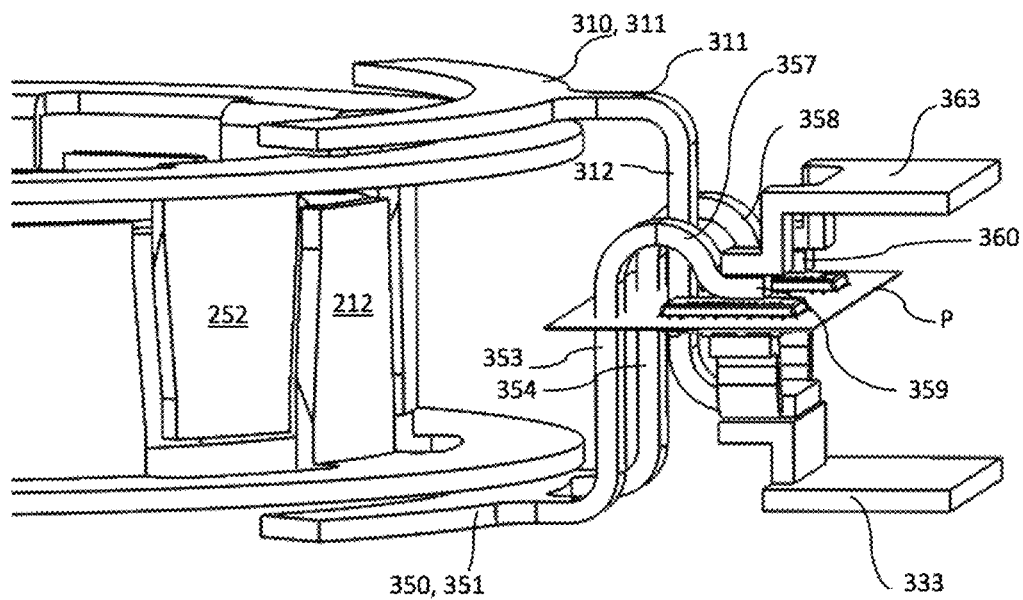

FIGS. 2A and 2B show perspective views of a variant embodiment, which differs from the first example described above by the addition of two secondary collection zones (333, 363).

The first secondary collection zone (333) is formed in this example by a rectangular sheet of a soft ferromagnetic material placed in a plane parallel to the plane of the angular sector (310), to which it is magnetically coupled by means of the secondary collection zone (313) and the front end of which defines one of the poles of the air gap. The fictitious transverse median plane (P) of the air gap is located between this first secondary collection zone (333) and the angular sector (310).

The surface of this first secondary collection zone (333) is approximately equal to the surface of the primary collection zone (351) and of the prolongations (353, 354). Indeed, compared to an external interference field, the primary collection zone (351) and the prolongations (353, 354) help to collect and bring the external field to the probes (301, 302) in a direction oriented here from top to bottom, while the secondary collection zone (333) collects and brings the external magnetic field to the probes (301, 302) in a direction oriented from bottom to top. Equalizing the zones (351, 353, 354 and 333) thus makes it possible to minimize the external magnetic interference field component by collecting equal flux in both of the described circulation directions.

The second secondary collection zone (363) is formed, in this example, by a rectangular sheet of a soft ferromagnetic material placed in a plane parallel to the plane of the primary collection zone (351), to which it is magnetically coupled via the flat extensions (359, 360), the front end of each of which defines the other of the faces of the air gap. The fictitious transverse median plane (P) of the air gap is located between this second secondary collection zone (363) and the primary collection zone (351).

The surface of this secondary collection zone (363) and of the secondary collection zones (357, 358) is approximately equal to the surface of the primary collection zone (311) and of the secondary collection zone (313). Indeed, compared to an external interference field, the primary collection zone (311), the prolongation (312) and the secondary collection zone (333) help to collect and bring the external field to the probes (301, 302) in a direction oriented here from bottom to top, while the secondary collection zone (363) and the secondary collection zones (357, 358) bring the external magnetic field to the probes (301, 302) in a direction from top to bottom. Equalizing the zones (363, 357, 358 and 311, 313) thus makes it possible to minimize the external magnetic interference field component.

Figure 3:
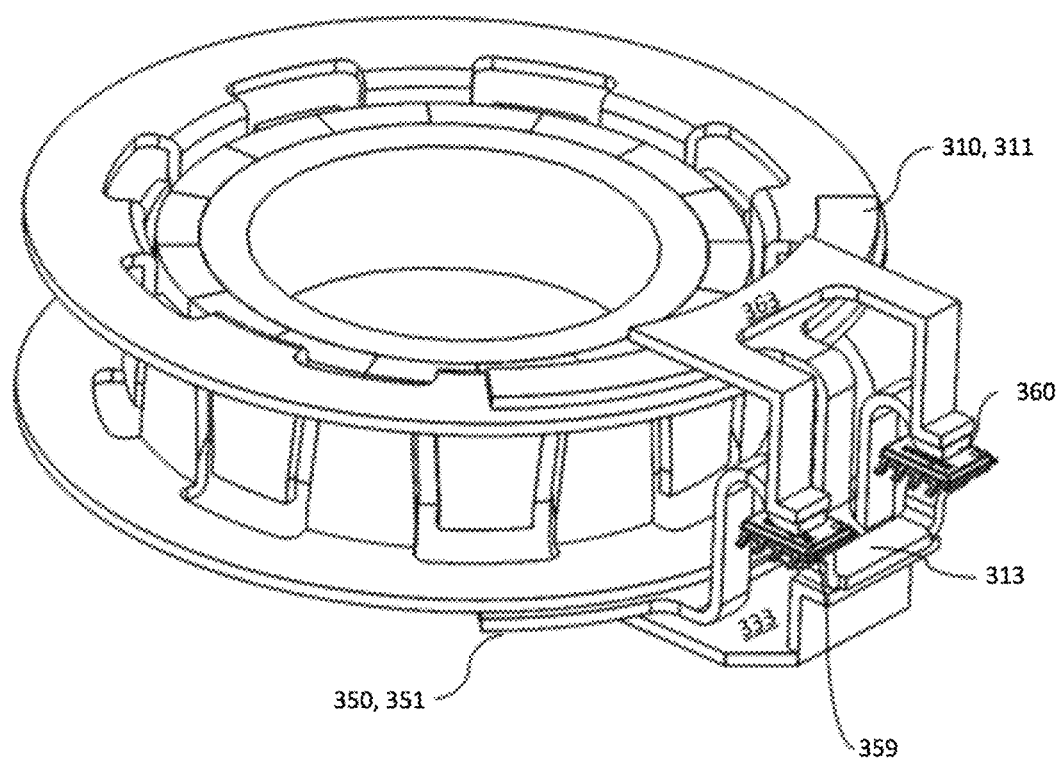
FIG. 3 shows a perspective view of a third embodiment of an angle sensor according to the present disclosure.

FIG. 3 shows a perspective view of an alternative embodiment, which differs from the embodiment of FIGS. 2A and 2B by the positioning of the two secondary collection zones (333, 363) overhanging the primary collection zones (311, 351) in order to make the sensor more compact in diameter.

The first secondary collection zone (333) is formed in this example by a sheet made of a soft ferromagnetic material placed directly above the primary collection zone (351) and located in a plane parallel to the plane of the primary collection zone (311), to which it is magnetically coupled via the secondary collection zone (313), a front end of which defines one of the poles of the air gap. The median plane (not shown) of the air gap is located between this first secondary collection zone (333) and the primary collection zone (311).

The second secondary collection zone (363) is formed, in this example, by a sheet of a soft ferromagnetic material placed in line with the primary collection zone (311) and located in a plane parallel to the plane of the primary collection zone (351), to which it is magnetically coupled through the flat extensions (359, 360), a front end of each of which defines the other of the poles of the air gap. The median plane (not shown) of the air gap is located between this first secondary collection zone (333) and the primary collection zone (351).

Figure 4:
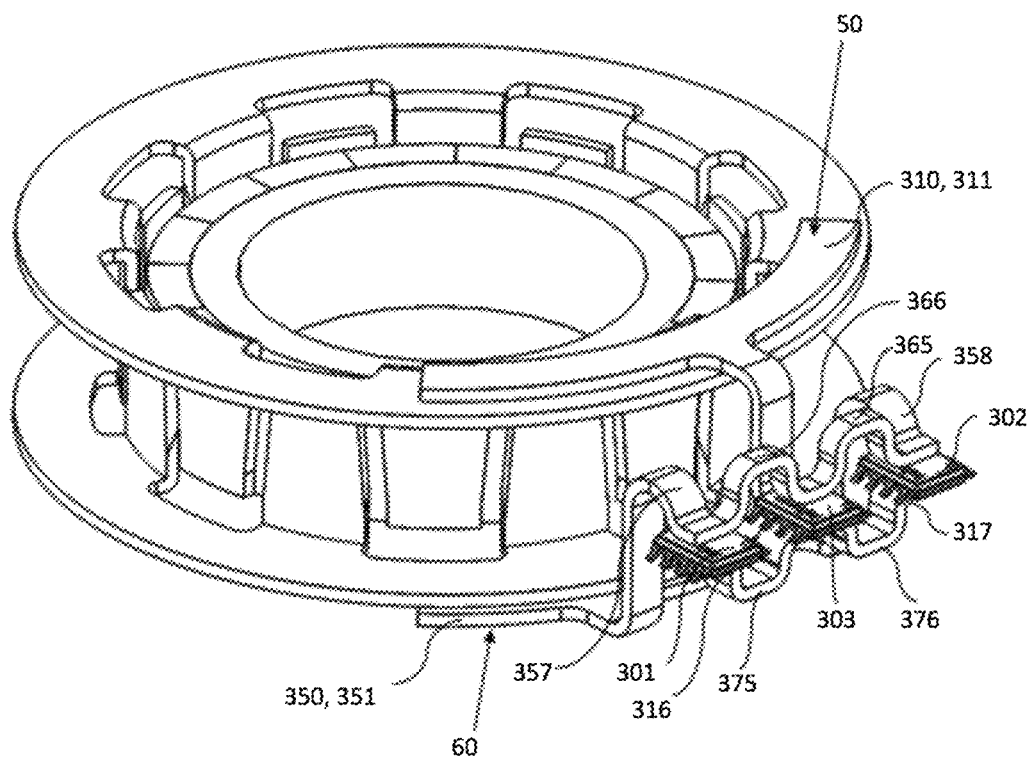
FIG. 4 shows a perspective view of a fourth embodiment of an angle sensor according to the present disclosure.

FIG. 4 shows a fourth embodiment of a sensor according to the present disclosure. Compared to the embodiment shown in FIGS. 1A and 1B, the secondary collection zones (357, 358), prolongations of the angular collection sector (350), are interconnected by a ferromagnetic sheet forming two secondary collection zones (365, 366) and the secondary collection zones (316, 317), prolongations of the angular collection sector (310), are interconnected by a ferromagnetic sheet forming two secondary collection zones (375, 376). This embodiment, in particular, makes it possible to place a third magnet-sensitive probe (303) to create information redundancy and to increase the surface area of the overall secondary collection zones compared to the embodiment of FIGS. 1A and 1B. The transverse median planes (not shown) of the air gaps at the probes (301, 302, 303) are positioned between the primary collection zones (311, 351) on the one hand and the secondary collection zones (357, 358, 365, 366, 375, 376) on the other hand. The median planes are, preferably, coplanar without this being necessary, the planes being able to be axially offset with respect to one another for possible production reasons. Likewise, the ferromagnetic sheet creating the secondary collection zones (365, 366) on the one hand and (375, 376) on the other hand are, preferably, an integral part of the collectors, respectively (50, 60), without this being necessary for the present disclosure. They can in fact be separate attached sheets.

Figure 5:
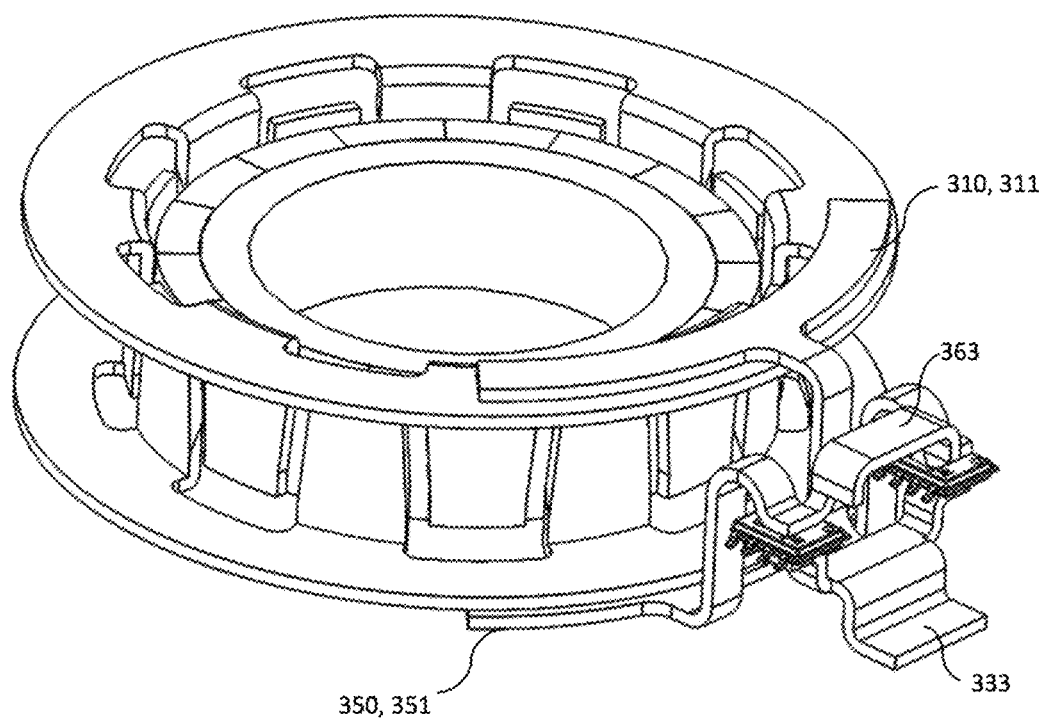
FIG. 5 shows a perspective view of a fifth embodiment of an angle sensor according to the present disclosure.

FIG. 5 is a variant embodiment similar to that shown in FIGS. 2A and 2B, but it differs in that the secondary collection zones (333, 363) are sheets that are an integral part of the collection parts, respectively (50, 60), and in that the general shapes of the secondary collection zones (333, 363) are different from those shown in FIGS. 2A and 2B generating different collection surfaces. This last characteristic illustrates the freedom allowed by the present disclosure to define these secondary collection zones (333, 363).

Figure 6:
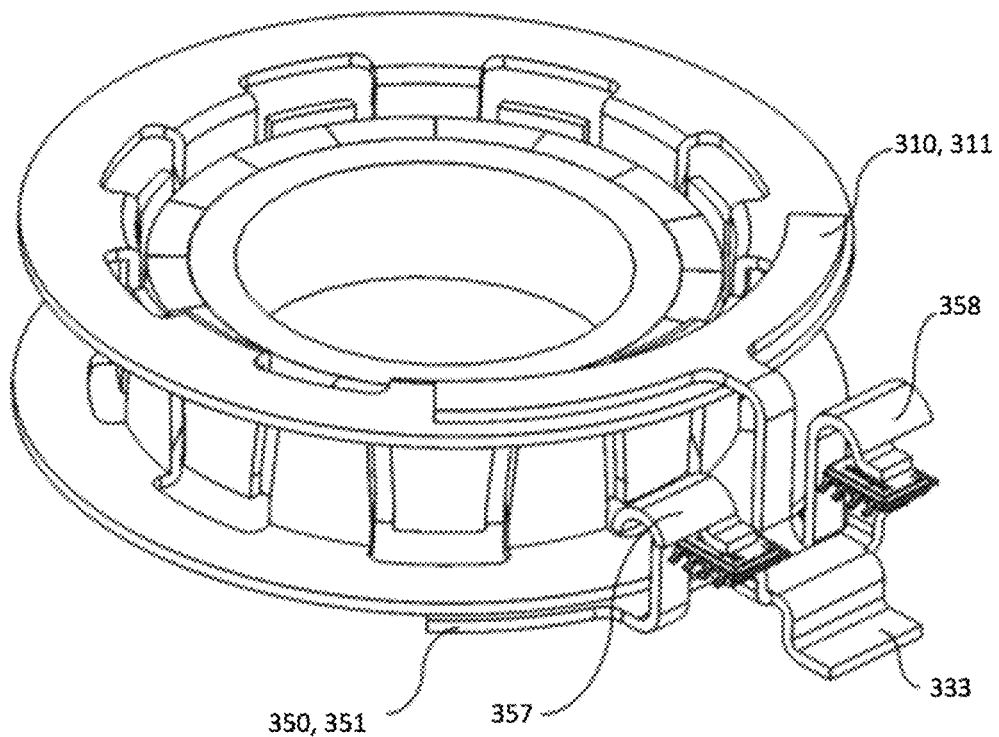
FIG. 6 shows a perspective view of a sixth embodiment of an angle sensor according to the present disclosure.

FIG. 6 shows a variant embodiment for which the primary collection zone (311) is extended by a secondary collection zone (333), in a manner similar to the variant shown in FIG. 5. However, the primary collection zone (351) is extended by two secondary collection zones (357, 358) that open out orthoradially so as to increase the collection surface of the secondary collection zones (357, 358).

Figure 7:
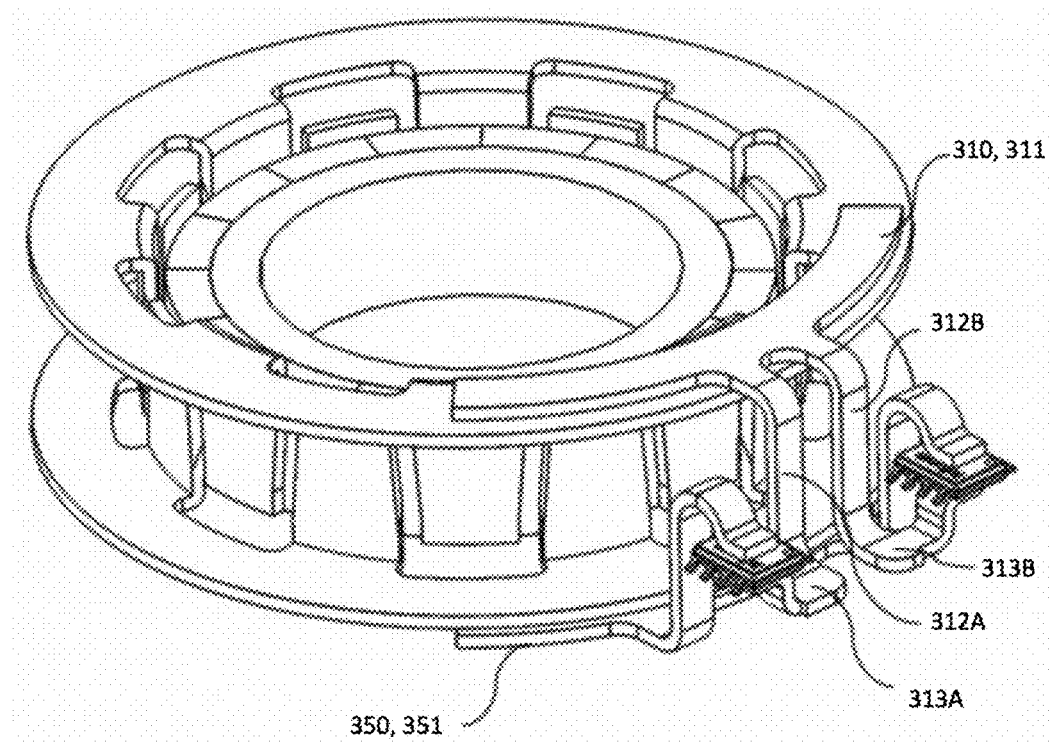
FIG. 7 shows a perspective view of a seventh embodiment of an angle sensor according to the present disclosure.

FIG. 7 shows a variant embodiment similar to that shown in FIGS. 1A and 1B, with the difference that the primary collection zone (311) here is extended by two prolongations (312A, 312B) that define two secondary collection zones (313A, 313B).

Figure 8A:
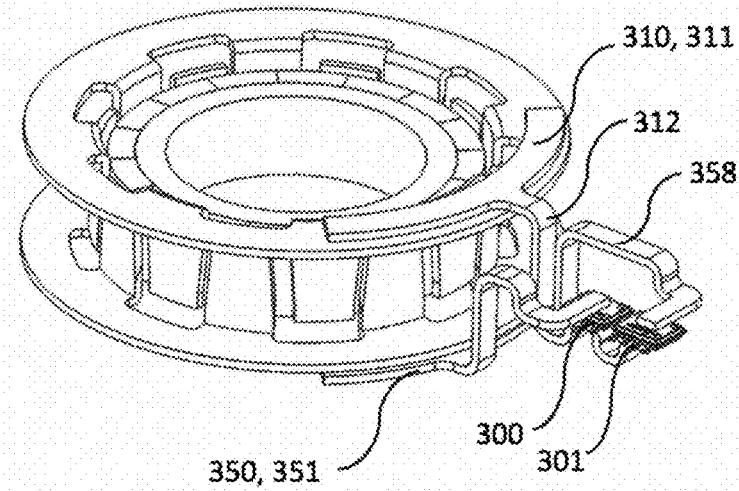
FIGS. 8A and 8B show two perspective views of a second embodiment of an angle sensor according to the present disclosure.
Figure 8B:
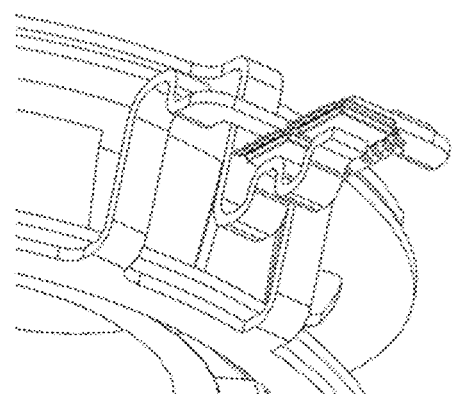

In FIGS. 8A and 8B, the two probes (300, 301) that are used are positioned on the same radius, the second probe (301) being radially further away than the first probe (300) of the plurality of magnets. To this end, the primary collection zone (311) is extended beyond the prolongation (312) by a secondary collection zone (358) that extends radially above the first probe (300).

Figure 9:
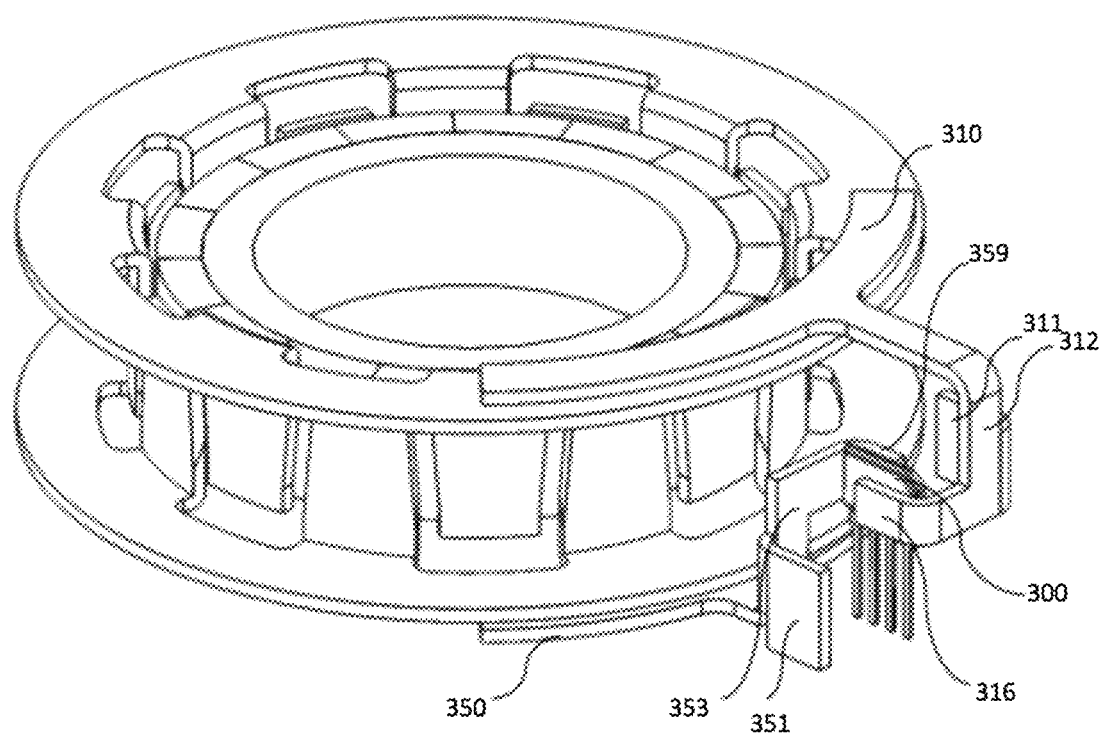
FIG. 9 shows a perspective view of a ninth embodiment of an angle sensor according to the present disclosure.

FIG. 9 illustrates an embodiment where the probe is oriented so as to present its axis of sensitivity at 90° relative to the other embodiments shown, the axis of sensitivity then being orthoradial and perpendicular to the axis of rotation of the sensor. In this non-imitative example, the angular sectors (310, 350) have prolongations (312, 353) extending axially and terminating in two flat extensions (316, 359) oriented orthoradially and defining the measurement air gap in which the probe (300) is placed. In this embodiment, the angular sectors (310, 350) are the primary collection zones of the flux, but are not particularly intended to be primary collection zones. In fact, in this configuration, the probe (300) is sensitive to an orthoradial component of the interference field and the angular sectors (310, 350) only participate in collecting the interference flux by their edge.

The prolongations (312, 353) have primary collection zones (311, 351) in order to collect the interference flux and bring it into the measurement air gap in a direction opposite that collected by the two flat extensions (316, 359), forming secondary collection zones.

Figure 10:
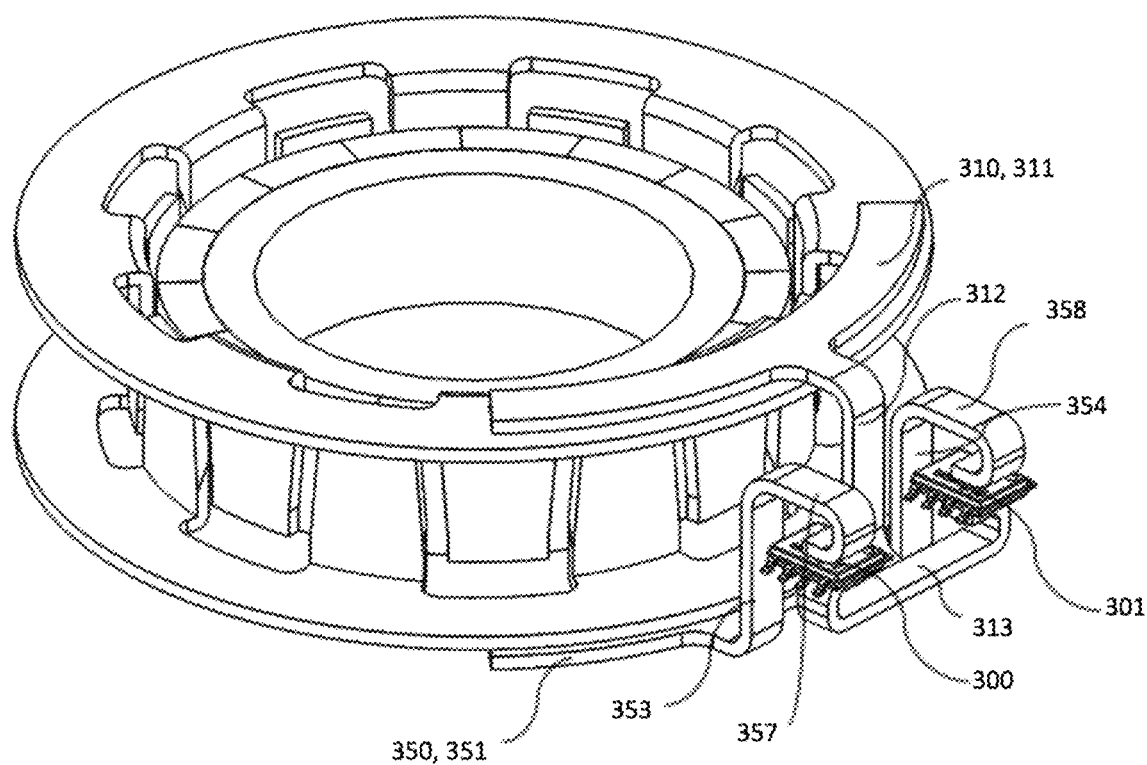
FIG. 10 shows a perspective view of a tenth embodiment of an angle sensor according to the present disclosure.

FIG. 10 shows a variant embodiment similar to that shown in FIGS. 1A and 1B with the difference that the prolongations (312, 353, 354) are continued by secondary collection zones (313, 357, 358) whose terminations are curved. The ends of the secondary collection zones (357, 358) are curved downward and toward the center of the plurality of magnets, while the ends of the secondary collection zone (313) extend parallel to the axis of rotation and are curved upward and closer to one another. This variation allows modification of the additional flux collection.

Figure 11:
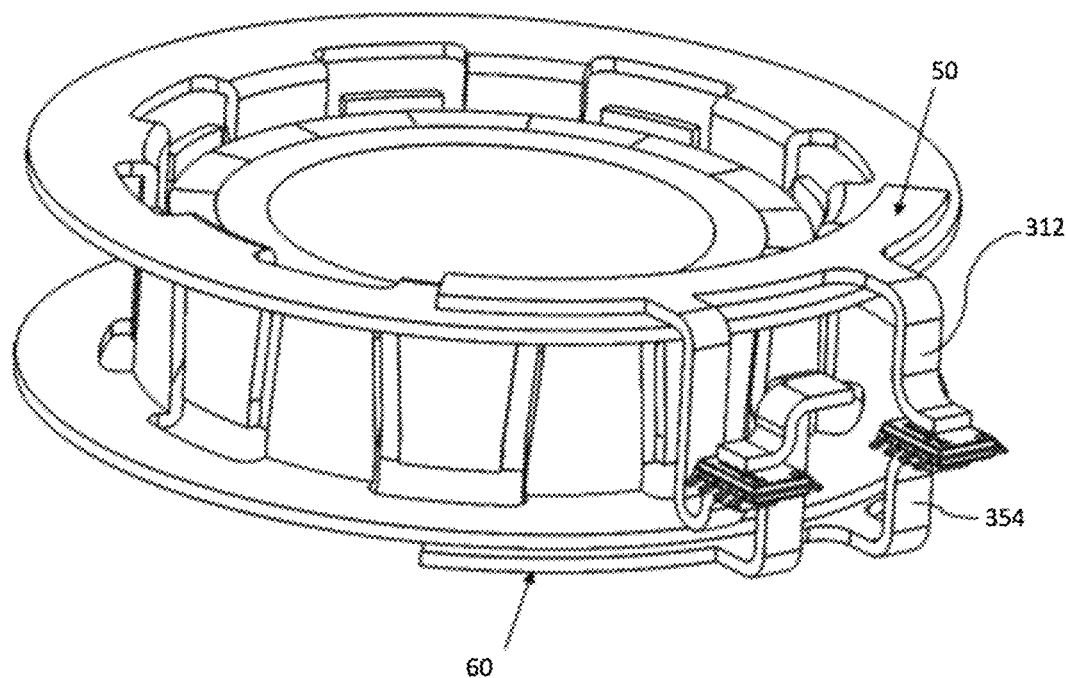
FIG. 11 shows a perspective view of an eleventh embodiment of an angle sensor according to the present disclosure.

It is understood, within the meaning of the present disclosure, that the various variants presented above are only a few examples of implementation. It is, of course, possible to consider additional variants by combining, at least in part, the different variants shown in terms of shape, size and relative positioning without departing from the scope of the present disclosure. Thus, it is also possible to consider having only one air gap out of the two having an inversion of the useful flux with respect to the interference flux and then carrying out an algebraic composition of the 2 signals read by the 2 probes in order to cancel the interference flux component. This last variant is illustrated in FIG. 11. The prolongations (312, 354) furthest to the right of the collection parts (50, 60) are identical to those of the prior art, the flux reversal only taking place from the prolongations situated furthest to the left according to the teachings cited above.

Figure 12:
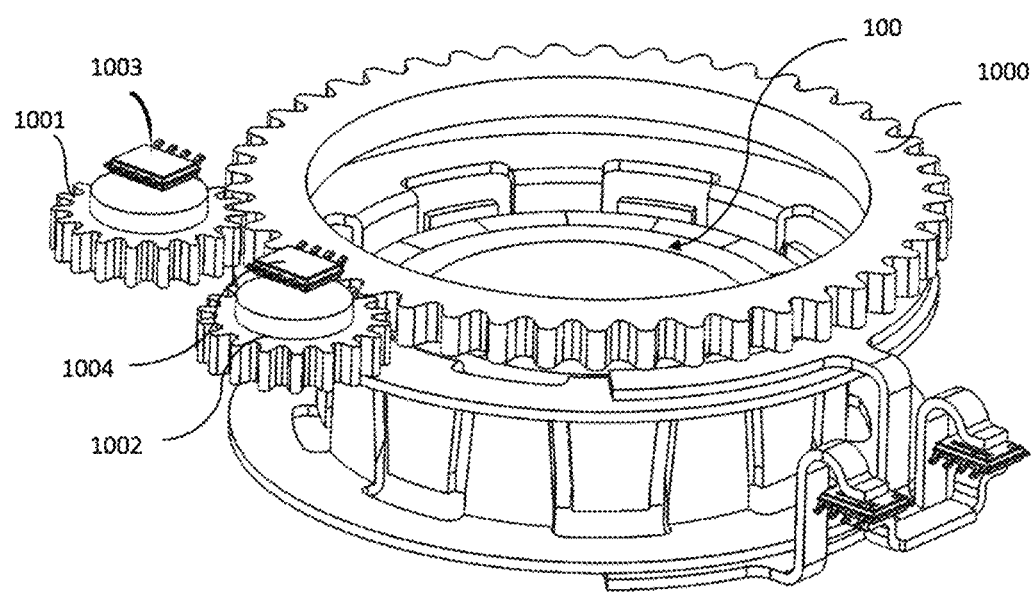
FIG. 12 shows a perspective view of a twelfth embodiment of an angle sensor according to the present disclosure coupled to a device for detecting the absolute position of the steering column.

FIG. 12 shows the association of a position sensor as defined by the present disclosure with an absolute position detection device. In this non-limiting example, a position sensor as defined in FIGS. 1A, 1B is associated with a device similar to that described in document WO2012084288. The latter device, using a principle of measurement by magnetic vernier, is intended to determine the absolute position over several turns of the steering column. The vernier-type device, in particular, comprises a main toothed wheel (1000), preferentially secured to the magnetized rotor structure (100). The rotation of the steering column therefore causes the rotation of the main wheel (1000), which in turn causes the rotation of the magnetized planet wheels (1001, 1002), which brings about the evolution of the signal at the magnet-sensitive probes (1003, 1004). It is thus possible to obtain an absolute angular position of the steering column over several rotations of this column.

It can, of course, be envisaged to use any variant of the position sensor according to the present disclosure with any absolute position detection device, this example of FIG. 12 not being limiting in any way in its embodiment.

Figure 13:
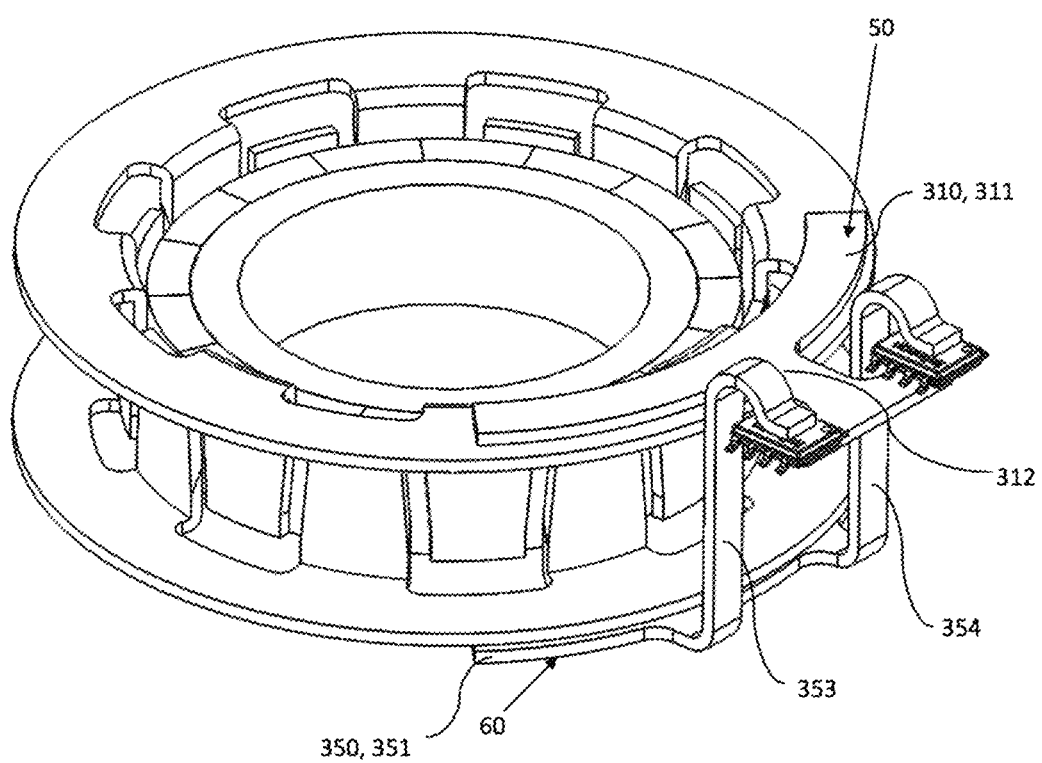
FIG. 13 shows a perspective view of another embodiment of an angle sensor according to the present disclosure.

FIG. 13 shows the embodiment where only one of the collection parts is intersected by the transverse plane (not shown) of the probes (300, 301). In fact, only the prolongations (353, 354) of the second collection part (60) and of the primary collection zone (351) are intersected by this plane, the prolongation (312) of the first collection part (50) and of the primary collection zone (311) being coplanar with the primary collection zone (311).

Figure 14A:
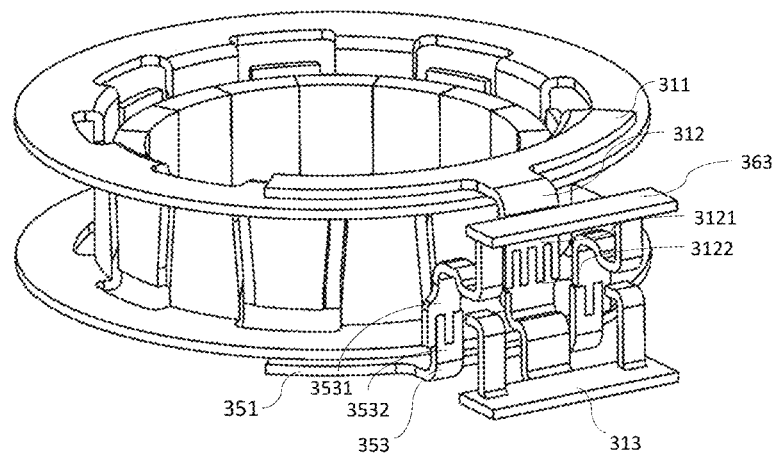
FIGS. 14A to 14E show perspective views of embodiments of the mechanical and magnetic connection between the primary collection zones and the secondary collection zones.

FIG. 14A shows an embodiment of the mechanical and magnetic connection between the primary collection zones (311, 351) and the secondary collection zones (313, 363). In this embodiment, this connection is ensured by the cooperation of complementary comb shapes (3121, 3122; 3531, 3532) in the area of the prolongations (312, 353). Such an assembly makes it possible to mount the collector assembly using a so-called axial "stacking" method.

Figure 14B:
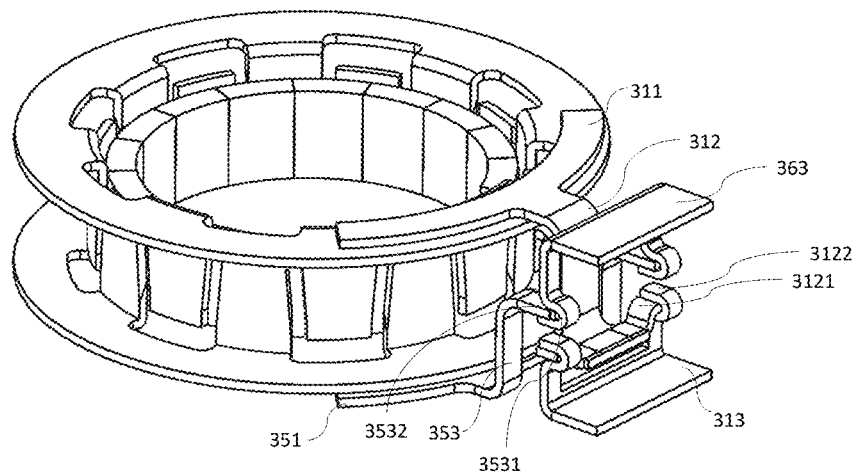

FIG. 14B shows an alternative embodiment of the mechanical and magnetic connection between the primary collection zones (311, 351) and the secondary collection zones (313, 363). In this embodiment, the secondary collection zones (313, 363) have, at their ends, U-shaped bent portions (3122, 3151) cooperating with the flat ends (3121, 3532) of the prolongations (312, 353) in order to achieve a connection by clipping. Such an assembly allows the additional collectors to be mounted by a radial movement.

Figure 14C:
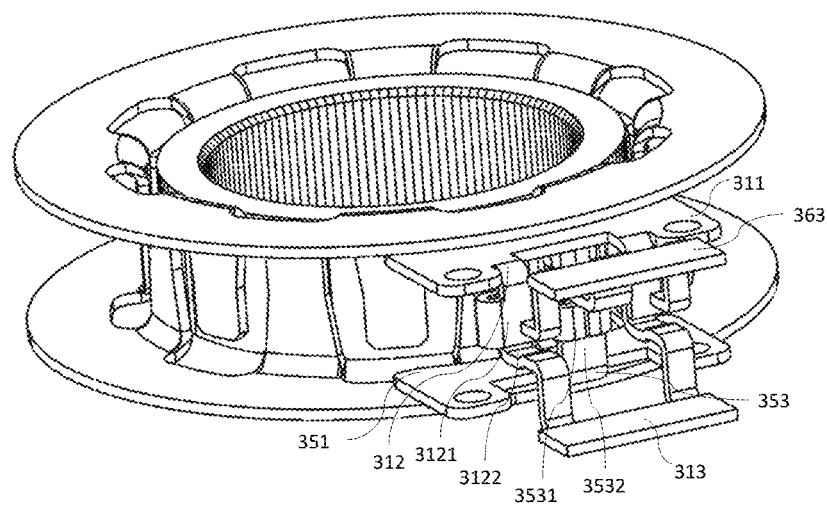

FIG. 14C shows an alternative embodiment of the mechanical and magnetic connection between the primary collection zones (311, 351) and the secondary collection zones (313, 363). In this embodiment, the secondary collection zones (313, 363) have, at their ends, U-shaped bent portions (3122, 3151) cooperating with the flat ends (3121, 3532) of the prolongations (312, 353) in order to achieve a connection by clipping. This embodiment differs from the previous embodiment shown in FIG. 14B in that the U-shaped bent portions are oriented in the axial direction. Such an assembly makes it possible to mount the collector assembly using a so-called axial "stacking" method.

Figure 14D:
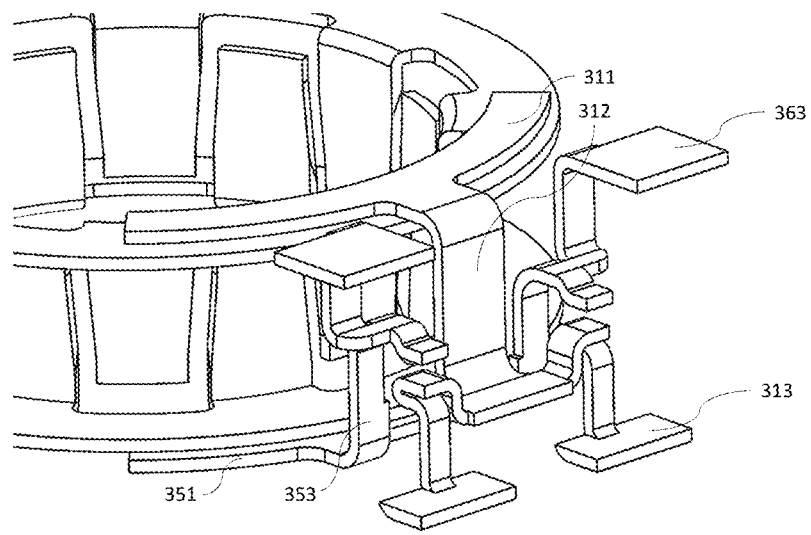

FIG. 14D shows an alternative embodiment of the mechanical and magnetic connection between the primary collection zones (311, 351) and the secondary collection zones (313, 363). In this variant, the primary and secondary collection zones are produced in a single piece by bending a sheet at the prolongations (312, 353). The magnetic and mechanical connection between the collectors is ideal in this case.

Figure 14E:
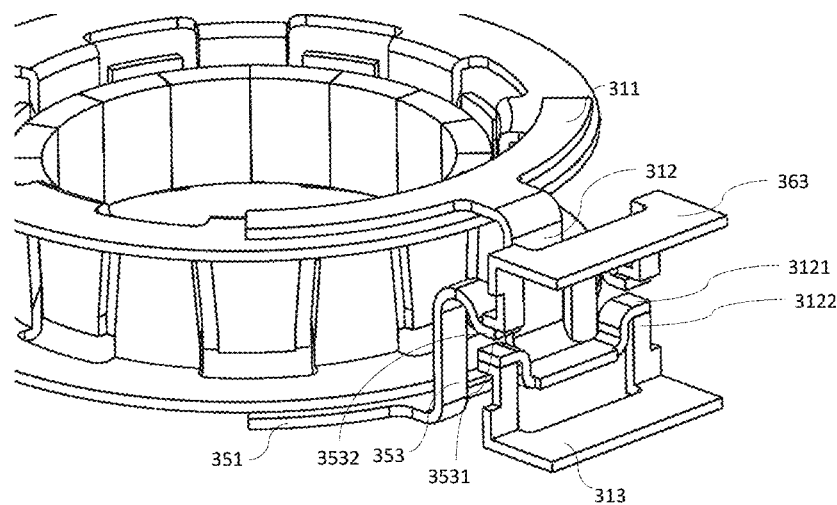

FIG. 14E shows an alternative embodiment of the mechanical and magnetic connection between the primary collection zones (311, 351) and the secondary collection zones (313, 363). In this embodiment, the secondary collection zones (313, 363) have flat ends (3122, 3151) cooperating with the flat ends (3121, 3532) of the prolongations (312, 353), the connection between the collectors then being ensured by a weld at the contacting surface. In this variant, the additional collectors are superimposed on the main collectors at the measurement air gap.

Figure 15:
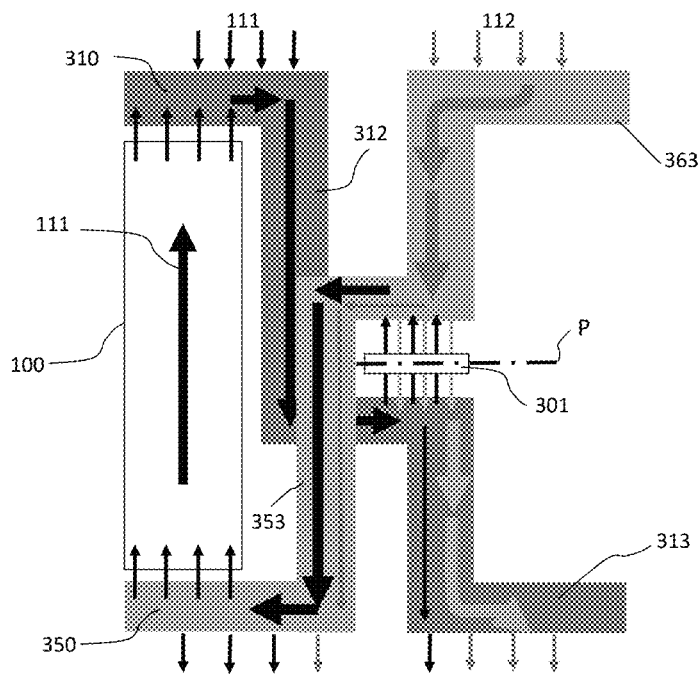
FIG. 15 shows a sectional diagram along a plane orthogonal to the axial direction.

FIG. 15 shows a sectional diagram along a plane orthogonal to the axial direction. This diagram caricatures the paths of the flux (111) coming from the magnetized rotor structure (100) and the interference fluxes (111, 112), respectively, collected by the primary (310) and secondary (363) collection zones. This diagram highlights the opposition of the interference fields (111, 112) passing through the probe (301), by mechanical coupling of the two flux collection parts (50, 60) at the probe (301). The cancellation of the interference field perceived by the probe is obtained by sizing of the primary (310) and secondary (363) collection zones.

The invention claimed is:
1. A position sensor, comprising:
a first magnetized magnetic rotor structure comprising a plurality of magnets;
a second stator structure comprising two rings comprising teeth that are axially oriented and interlocked; and
a third stationary collector structure including two flux collection parts that define at least one air gap in which at least one magnet-sensitive element is placed, the two flux collection parts and the two rings defining therebetween a magnetic permeance independent of a relative radial position and a relative angular position of the second stator structure with respect to the third stationary collector structure, the two flux collection parts each comprising an angular collection sector;
wherein each flux collection part has at least one primary collection zone continued by at least one prolongation having at least one secondary collection zone;
wherein the at least one secondary collection zone of each flux collection part is terminated by flat extensions forming two poles of the at least one air gap;
wherein a transverse median plane of the at least one air gap intersects the at least one prolongation of at least one of the two flux collection parts; and
wherein the at least one primary collection zone of a first collection part of the two flux collection parts and the at least one secondary collection zone of a second collection part of the two flux collection parts are not perpendicular, or the at least one primary collection zone of the second collection part and the at least one secondary collection zone of the first collection part are not perpendicular.

2. The position sensor of claim 1, wherein the transverse median plane is parallel to a plane of the at least one primary collection zone of each flux collection part.

3. The position sensor of claim 2, wherein the at least one prolongation extends axially and perpendicular to the plane of the at least one primary collection zone of each flux collection part beyond the transverse median plane.

4. The position sensor of claim 3, wherein the at least one prolongation is continued by a flat section forming the at least one secondary collection zone parallel to the plane of the at least one primary collection zone.

5. The position sensor of claim 4, wherein the at least one secondary collection zone has a parallelepipedal shape.

6. The position sensor of claim 5, wherein two sides of the at least one secondary collection zone are extended by a tab oriented in a direction of the angular collection sector and exhibiting a flat extension forming one of the two poles of the at least one air gap.

7. The position sensor of claim 3, wherein the at least one primary collection zone of one of the two flux collection parts is extended by the at least one secondary collection zone of one of the two flux collection parts extending on either side of the at least one prolongation.

8. The position sensor of claim 7, wherein the at least one secondary collection zone of one of the two flux collection parts defines a reversal region with tangent surfaces parallel to the at least one primary collection zone of each flux collection part.

9. The position sensor of claim 8, wherein the transverse median plane extends between the at least one primary collection zone and the tangent surfaces.

10. The position sensor of claim 9, wherein the tangent surfaces extend in a direction of the at least one air gap and the at least one primary collection zone ends in an extension to form one of the two poles of the at least one air gap.

11. The position sensor of claim 1, wherein the third stationary collector structure comprises two additional secondary collection zones, the two additional secondary collection zones including:
a first additional secondary collection zone being placed in a plane parallel to a plane of the at least one primary collection zone to which it is magnetically coupled via the at least one secondary collection zone, a front end of which defines one of the two poles of the at least one air gap, the transverse median plane of the at least one air gap being located between the first additional secondary collection zone and the at least one primary collection zone to which it is magnetically coupled; and
a second additional secondary collection zone being placed in a plane parallel to a plane of the at least one primary collection zone to which it is magnetically coupled by means of flat extensions, one front end of which defines the other of the two poles of the at least one air gap, the transverse median plane of the at least one air gap being situated between the second additional secondary collection zone and the at least one primary collection zone to which it is magnetically coupled.

12. The position sensor of claim 1, wherein a total surface area of the at least one secondary collection zone is equal to a total surface area of the at least one primary collection zone.

13. The position sensor of claim 1, wherein the position sensor is configured to detect a torsion of a steering column.

14. The position sensor of claim 1, wherein the two flux collection parts are configured to collect an interference field with the at least one primary collection zone and with the at least one secondary collection zone and to reverse the collected interference field at the at least one air gap with respect to one another owing to the relative positioning of the at least one primary collection zone and the at least one secondary collection zone.

15. A device for detecting an absolute position of a steering column, comprising a sensor for detecting a torsion of the steering column including:
a first magnetized magnetic rotor structure comprising a plurality of magnets;
a second stator structure comprising two rings comprising teeth that are axially oriented and interlocked; and
a third stationary collector structure including two flux collection parts that define at least one air gap in which at least one magnet-sensitive element is placed;
wherein the two flux collection parts and the two rings define therebetween a magnetic permeance independent of a relative radial position and relative angular position of the second stator structure with respect to the third stationary collector structure;
wherein the two flux collection parts each comprise an angular collection sector, each flux collection part having at least one primary collection zone continued by at least one prolongation having at least one secondary collection zone, the at least one secondary collection zone of each of the two flux collection parts being terminated by flat extensions forming two poles of the at least one air gap, a transverse median plane of the at least one air gap intersecting the at least one prolongation of at least one of the two flux collection parts; and wherein the at least one primary collection zone of a first collection part of the two flux collection parts and the at least one secondary collection zone of a second collection part of the two flux collection parts are not perpendicular, or the at least one primary collection zone of the second collection part and the at least one secondary collection zone of the first collection part are not perpendicular.

\* \* \* \* \*